(12) United States Patent
Shimotsu

(10) Patent No.: US 6,908,129 B2
(45) Date of Patent: Jun. 21, 2005

(54) SHOCK ABSORBER

(75) Inventor: Koji Shimotsu, Soja (JP)

(73) Assignee: Asteer Co., Ltd., Okayama (JP)

( * ) Notice: Subject to any disclaimer, the term of this patent is extended or adjusted under 35 U.S.C. 154(b) by 0 days.

(21) Appl. No.: 10/758,163

(22) Filed: Jan. 15, 2004

(65) Prior Publication Data

US 2004/0155473 A1 Aug. 12, 2004

(30) Foreign Application Priority Data

Feb. 6, 2003 (JP) ........................................ 2003-030056

(51) Int. Cl.$^7$ ............................................ B60R 19/34
(52) U.S. Cl. ...................................... 293/133; 293/132
(58) Field of Search ................................ 293/132, 133

(56) References Cited

U.S. PATENT DOCUMENTS

| | | | |
|---|---|---|---|
| 6,293,587 B1 | | 9/2001 | Lapic et al. |
| 6,698,809 B2 | * | 3/2004 | Stol et al. ............... 293/133 |
| 6,702,345 B1 | * | 3/2004 | Yoshida ................. 293/133 |
| 2002/0167183 A1 | * | 11/2002 | Shimotsu et al. ........ 293/132 |
| 2003/0034661 A1 | | 2/2003 | Golanda et al. |
| 2003/0075935 A1 | * | 4/2003 | Dohrmann .............. 293/133 |

FOREIGN PATENT DOCUMENTS

| | | |
|---|---|---|
| JP | 2001-047952 | 2/2001 |
| JP | 2001-138841 | 5/2001 |

* cited by examiner

*Primary Examiner*—Jason Morrow
(74) *Attorney, Agent, or Firm*—Koda & Androlia

(57) ABSTRACT

A shock absorber capable of preventing the collapse or deformation of a vehicle body member when a local load applied to a bumper, without being influenced by the arrangement and construction of the vehicle body member. The shock absorber comprises a multi-diameter stepped tube having different diameter tube portions integrally formed by partially reducing or partially enlarging a straight tube that can be plastically deformed through a stepped portion connecting those tube portions under installation of which a smaller-diameter tube portion connecting to the bumper and of which a larger-diameter tube portion connecting to the side member, a mounting part having a quadrilateral shape with a diagonal length of which is longer than the diameter of the larger-diameter tube portion and positioned at a front end of the side member, and load transmission members fixed between an outer side surface of the larger-diameter tube portion and the mounting part.

6 Claims, 10 Drawing Sheets

Load - Displacement Characteristics

SHOCK ABSORBER

BACKGROUND OF THE INVENTION

1. Field of the Invention

This invention relates to a shock absorber adapted to absorb impact energy therein, such as a load imparted to a bumper of an automobile, for example, when the automobile collides with something, and prevent or suppress the transmission of the impact energy to a vehicle body member. More particularly, the invention relates to a shock absorber adapted to absorb impact energy therein by converting the impact energy into deformation energy for plastically deforming a tube portion thereof.

2. Description of the Related Art

In order to prevent or suppress the transmission of impact energy, a load imparted to a bumper of an automobile to a vehicle body member, a shock absorber adapted to absorb the impact energy therein is usually provided between the bumper and a side member. Such shock absorbers include a cylinder type shock absorber, and a plastic deformation type shock absorber. Although the latter plastic deformation type shock absorber has a simple construction, and light weight as compared with the cylinder type shock absorber, the plastic deformation type shock absorber has the advantage of displaying an excellent impact energy absorbing performance and being capable of changing the design thereof flexibly and easily in accordance with a vehicle weight difference. For these reasons, the plastic deformation type shock absorber is used in many cases as seen in JP-A-2001-047952, JP-A-2001-138841, U.S. Pat. No. 6,293,587 and USP Laid-Open 2003/0034661.

As seen in FIG. 9, a plastic deformation type shock absorber has a body as a main element (which will hereinafter be referred to as a multi-diameter stepped tube or a two-stage tube) of a stepped tube structure including a smaller-diameter tube portion 2 and a larger-diameter tube portion 3 which are joined integrally via a stepped portion 7. The smaller-diameter tube portion 2 is connected to a bumper 10, and the larger-diameter tube portion 3 to a side member 8. The impact energy transmitted from the bumper 10 works to compress the two-stage tube 1 as a whole in the longitudinal direction of a vehicle, and the impact energy is absorbed as the energy occurring at this time for plastically deforming the two-stage tube 1. During this time, the two-stage tube 1 is locally supported on an intersection of a rear end peripheral edge 11 of the larger-diameter tube portion 3 and a frame of the side member 8, so that a load is necessarily imparted to the intersection in a concentrated manner.

In order to sufficiently display the impact energy absorbing function of the plastic deformation type shock absorber, it is necessary that the multi-diameter stepped tube as a whole be compressed uniformly without causing the vehicle body member to be deformed in an impact absorbing operation. However, when a local load is imparted to the intersection of the two-stage tube 1 and side member 8 which supports the two-stage tube 1 thereon, as mentioned above, the vehicle body member becomes liable to be relatively deformed due to the concentrated impact energy, so that it becomes unable to make the best use of the performance which the shock absorber possesses. When, in a shock absorbing operation, upper and lower edges of a mounting part 9 provided at a front end of the side member 8 are bent as seen in, for example, FIG. 10 in the direction opposite to the impact imparting direction at an end surface as a boundary surface of the larger-diameter tube portion, the side member 8 is collapsed or deformed. As a result, the function of the shock absorber of preventing or suppressing the transmission of a load to the vehicle body members is restricted.

Improving the rigidity of a front end of the side member connected to a rear end of the shock absorber including increasing the thickness of, for example, a plate constituting the mounting part 9 is conceived as a method of solving such problems. However, such measures cause the cost of materials to increase, and improving the strength of a part of the structure gives rise to a problem of losing a balance of the strength of the vehicle body member as a whole. Under the circumstances, a shock absorber capable of preventing the collapse or deformation of vehicle body member ascribed to the local application of a load to the shock absorber, without being influenced by the arrangement or construction of the vehicle body members.

SUMMARY OF THE INVENTION

The present invention provides a shock absorber including a multi-diameter stepped tube having different diameter integral tube portions formed by partially reducing or partially enlarging a straight tube that can be plastically deformed, and at least one stepped portion formed between adjacent edges of each different diameter tube portions to join the tube portions integrally, in which a smaller-diameter tube portion as one end of the multi-diameter stepped tube is connected to a bumper, and in which a larger-diameter tube portion as other end of the multi-diameter stepped tube is connected to a side member; a mounting part, having a quadrilateral shape with a diagonal length of which is longer than a diameter of the larger-diameter tube portion, positioned at a front end of the side member; and a load transmission member fixed between an outer side surface of the larger-diameter tube portion and the mounting part.

A multi-diameter stepped tube used for this shock absorber is formed basically by a two-stage tube including a smaller-diameter tube portion and a larger-diameter tube portion. The multi-diameter stepped tube may also be a three-stage tube including, for example, a smaller-diameter tube portion, an intermediate-diameter tube portion and a larger-diameter tube portion. In this case, the relation between the smaller-diameter tube portion of the three-stage tube and the intermediate-diameter tube portion thereof and the relation between the intermediate-diameter tube portion thereof and the larger-diameter tube portion thereof correspond respectively to that between the smaller-diameter tube portion and larger-diameter tube portion of the two-stage tube.

The shock absorber according to the present invention is adapted to absorb as tube deforming energy the impact energy of a load imparted to a bumper due to the plastic deformation of the multi-diameter stepped tube. To be concrete, the smaller-diameter tube portion of the multi-diameter stepped tube is absorbed in inside of the larger-diameter tube portion thereof due to the impact energy of the load received from the bumper. During this time, the larger-diameter tube portion is turned inward, and the impact energy is thereby absorbed as the larger-diameter tube portion deforming energy.

In the shock absorber according to the present invention, the rear end peripheral edge of the larger-diameter tube portion of the multi-diameter stepped tube is connected to the mounting part positioned at the front end of the side member, and the outer surface of the larger-diameter tube portion and the mounting part are connected together directly by the load transmission member. The range in which the load is applied to the side member is thereby expanded and dispersed. The mounting part may be a front end surface itself of the side member or a plate member provided at a front end of the side member as long as the mounting part has a quadrilateral shape with a diagonal length of which is longer than the diameter of the larger-diameter tube portion. Thus, the load transmission member may be regarded as an adapter for making the cross-sectional shape of the rear end peripheral edge of the larger-diameter tube and that, which is different from the shape of the mentioned peripheral edge, of the mounting part at the front end of the side member conform to each other. The load transmission member may be any of a surface material, plate material and a rod material, which is to be fixed in a position away from the rear end of the larger-diameter tube portion to both the outer side surface of the larger-diameter tube portion and the mounting part. The expanding and dispersing of the range, in which a load is applied to a bumper, done by this load transmission member prevents the collapse or deformation of the vehicle body member which occurs due to the local application of the load. Since it is desirable that the load dispersed by the load transmission member be uniform in the range in which the load is imparted to the mounting part, it is recommendable that the load transmission member be formed to a structure for connecting the outer side surface of the larger-diameter tube portion and the mounting part together in the point symmetric positional relation with respect to the axial center of the multi-diameter stepped tube.

In order that the load transmission member efficiently expands and disperses the load application range, it is desirable that the multi-diameter stepped tube be plastically deformed in the axial direction in a stable condition. Therefore, the multi-diameter stepped tube constituting the shock absorber according to the present invention may comprise a stepped portion formed by axially absorbing the smaller-diameter tube portion in inside of the larger-diameter tube portion. The stepped portion comes to have a substantially S-shaped axial cross section. It is recommendable that a radius of curvature of a cross section of a folded-back portion of a rear end peripheral edge of the smaller-diameter tube portion be set to a level relatively smaller than that of a cross section of a folded-back portion of a front end peripheral edge of the larger-diameter tube portion. When the condition in which the smaller-diameter tube portion of the multi-diameter stepped tube is slightly absorbed in inside of the larger-diameter tube portion thereof in advance is set as an initial condition, the smaller-diameter tube portion can be guided so as to attain the smooth absorbing thereof in the larger-diameter tube portion. Furthermore, the stepped portion may be formed so as to have a substantially S-shaped cross-sectional shape by joining the rear end peripheral edge of the smaller-diameter tube portion and the front end peripheral edge of the larger-diameter tube portion, both of which has an arcuate cross section, with each other via a tubular wall of the stepped tube. Owing to this structure, the tubular wall serves to suppress or prevent the inclination of the smaller-diameter tube portion when the smaller-diameter tube portion starts being absorbed in the larger-diameter tube portion, so that the smaller-diameter tube portion can be guided so as to attain the smooth absorbing thereof in the larger-diameter tube portion.

The load transmission member may be formed by at least a pair of flat members having a side member-side mounting edge extending along a shape of a part of the outer periphery of the mounting part and a tube-side mounting edge extending along a shape of a part of an outer side surface of the larger-diameter tube portion. The reason why the side member-side mounting edge is extended along a shape of an outer periphery of the mounting part resides in that the transmitted load can be dispersed in the widest range with the possibility of occurrence of the collapse or deformation of the side member reduced to a minimum level. However, since this load transmission member is a flat member, the side portions thereof are opened when the load transmission member is fixed in a predetermined position. In this structure, the possibility that, when a load is imparted to the multi-diameter stepped tube in the axial direction thereof, the load transmission member is buckled is still remained.

Therefore, the load transmission member may be formed by at least a pair of curved cover members having a side member-side mounting edge extending along a shape of the outer periphery of the mounting part, and a tube-side mounting edge extending along a shape of the outer side surface of the larger-diameter tube portion continuously through the intersectional part determined by connecting the mounting part and the larger-diameter tube portion from the side member-side mounting edge. Owing to this structure, the opened side portions of the load transmission member are closed, and the structural strength of the load transmission member with respect to the buckling can be heightened, so that the possibility of occurrence of the collapse or deformation of the front end portion of the side member can be further reduced at once.

According to the present invention, the effect of enabling the prevention of the collapse or deformation of the vehicle body member ascribed to the local application of a load in the plastic deformation type shock absorber can be obtained without being influenced by the arrangement or construction of the vehicle body member. This is an effect of the load transmission member having a function of expanding and dispersing the load transmission range. Since the shock absorber according to the present invention does not cause the collapse or deformation of the vehicle body member, the load-deformation characteristics close to a design value of the multi-diameter stepped tube can be attained. Thus, the present invention attains a substantial improvement of the performance of the shock absorber, though the quantity of absorption of impact energy due to the plastic deformation of the multi-diameter stepped tube does not vary.

BRIEF DESCRIPTION OF THE DRAWINGS

A preferred embodiment of the present invention will now be described with reference to the drawings, wherein.

DETAILED DESCRIPTION OF THE INVENTION

Figure 1:
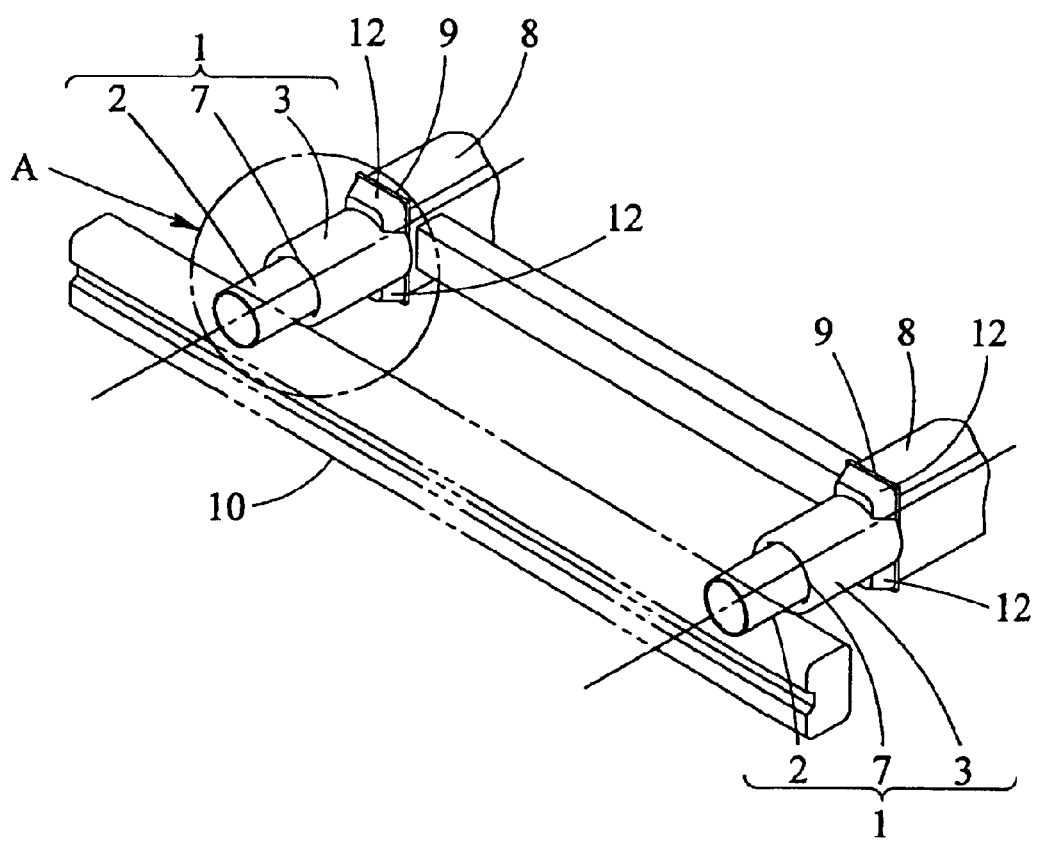
FIG. 1 is a perspective view showing an applied example of the shock absorber according to the present invention.
Figure 2:
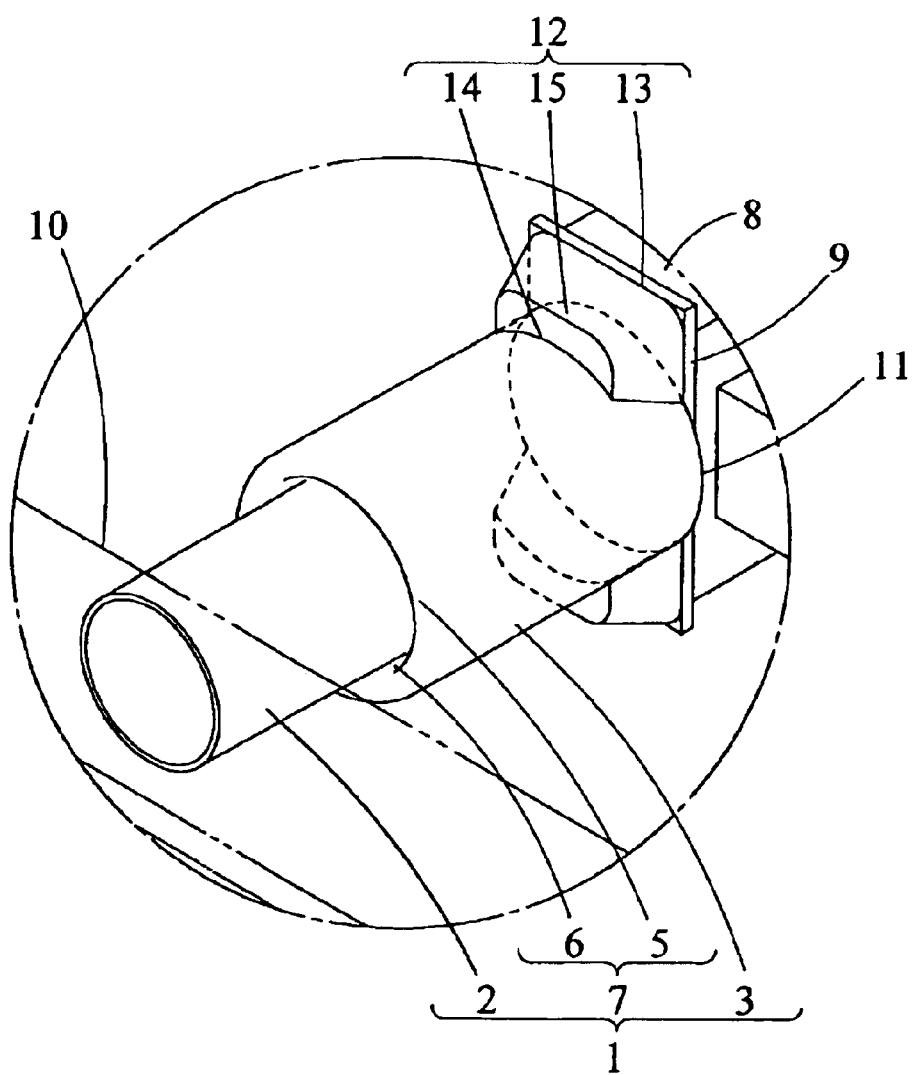
FIG. 2 is an enlarged perspective view of a portion designated by an arrow A in FIG. 1.

As shown in FIG. 1, FIG. 2 and FIG. 4 to FIG. 6, the shock absorber in this example uses a two-stage tube 1 formed by a stepped portion 7 at which a smaller-diameter tube portion 2 and a larger-diameter tube portion 3 are joined integrally by partially reducing or partially enlarging a straight tube that can be plastically deformed. The stepped portion 7 of the two-stage tube 1 is formed by axially absorbing the smaller-diameter tube portion 2 in inside of the larger-diameter tube portion 3 (refer to a one-dot chain line in FIG. 1, and the same applies to the similar description to be given later). The stepped portion 7 has a substantially S-shaped cross sectional shape formed by integrally joining the rear end peripheral edge 4 of the smaller-diameter tube portion 2 having arcuate shape cross-sectionally and the cross-sectionally arcuate front end peripheral edge 5 of the larger-diameter tube portion 3 having arcuate shape cross-sectionally with each other via a tubular wall 6. Furthermore, the radius of curvature of a cross section of the folded-back portion of the rear end peripheral edge 4 of the smaller-diameter tube portion 2 is set relatively smaller than that of the folded-back part of the front end peripheral edge 5 of the larger-diameter tube portion 3.

The multi-diameter stepped tube 1 is abutted at the rear end peripheral edge 11 of the larger-diameter tube portion 3 thereof to the mounting part 9 fixed to the front end of the side member 8 constituting the vehicle body member, and then fixed thereto by welding. The bumper 10 is joined to the smaller-diameter tube portions 2, 2 of left and right multi-diameter stepped tubes 1, 1. The mounting part 9 is a plate type member with closing the opening of the front end of the side member 8. The height of the mounting part 9 is larger than the diameter of the larger-diameter tube portion 3, and the width thereof is smaller than the diameter of the larger-diameter tube portion 3. Therefore, the rear end peripheral edge 11 of the larger-diameter tube portion 3 is partially engaged with the mounting part 9 in the range in which the rear end peripheral edge 11 and mounting part 9 are superposed on each other.

In this example, the upper and lower load transmission members 12, 12 are put over the larger-diameter tube portion 3 and the mounting part 9. Each load transmission member 12 includes a curved cover member having a side member-side mounting edge 13 extending along a shape of the outer periphery of the mounting part 9 fixed to the front end portion of the side member 8, and the tube-side mounting edge 14 extending along a shape of the outer side surface of the larger-diameter tube portion 3 continuously through the intersectional part determined by connecting the mounting part 9 and the larger-diameter tube portion 3 from the side member-side mounting edge 13 (refer to FIG. 2). In this example, the surface connecting the tube-side mounting edge 14 and the side member-side mounting edge 13 together is a curved surface 15 bulging outward so as to improve the structural strength of the load transmission member 12. Thus, each load transmission member 12 has a substantially semi-frusto-conical shape in external appearance.

Figure 3:
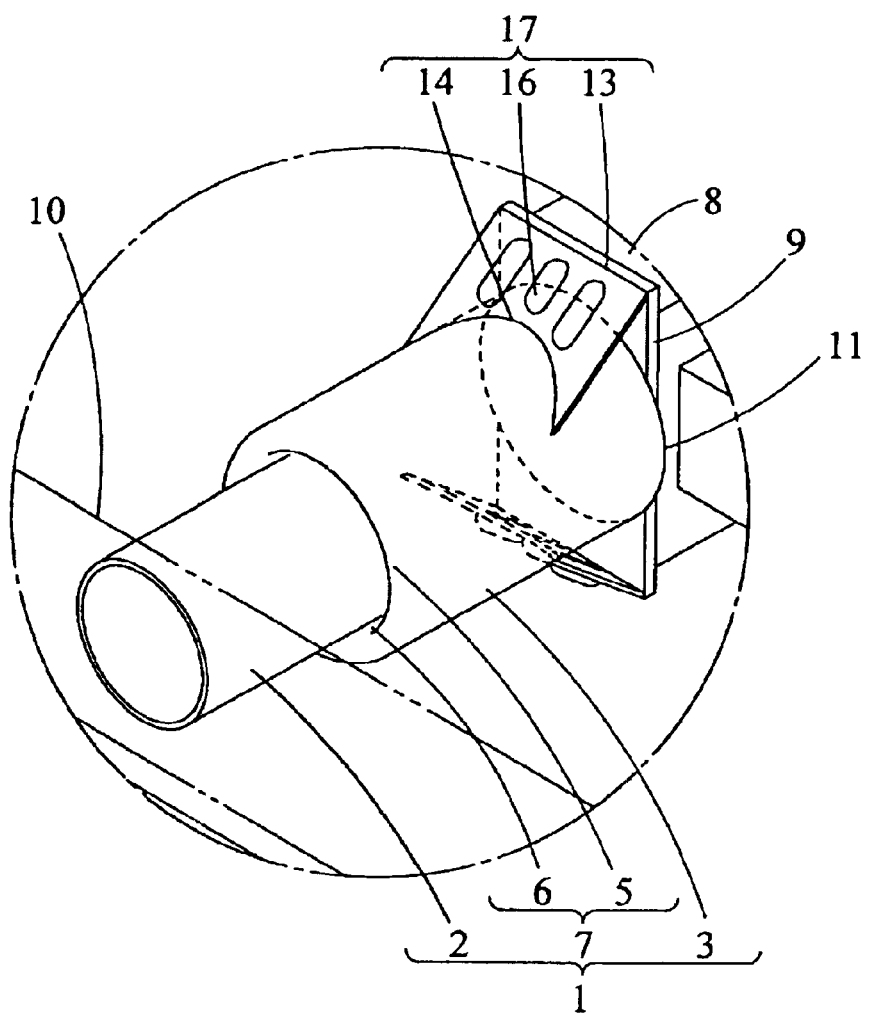
FIG. 3 is a perspective view corresponding to FIG. 2 and showing another example of the shock absorber according to the present invention.

The load transmission member 12 serves the purpose as long as the load transmission member 12 connects together the outer side surface of the larger-diameter tube portion 3 and the mounting part 9 at the front end of the side member 8 and can expand the load application range from the size of the rear end peripheral edge 11 of the larger-diameter tube portion 3 to that of the mounting part 9 at the front end of the side member 8. In view of above, the outer side surface of the larger-diameter tube portion 3 and mounting part 9 at the front end of the side member 8 may be joined together by using the load transmission member 17, which is formed by a plate type material the rigidity of which is increased by providing ribs 16 thereon so as to be integral therewith, as seen in, for example, FIG. 3. The ribs 16 work so as to improve the rigidity of the flat plate material and prevent the load transmission member 17 from being bent due to a load.

Figure 6:
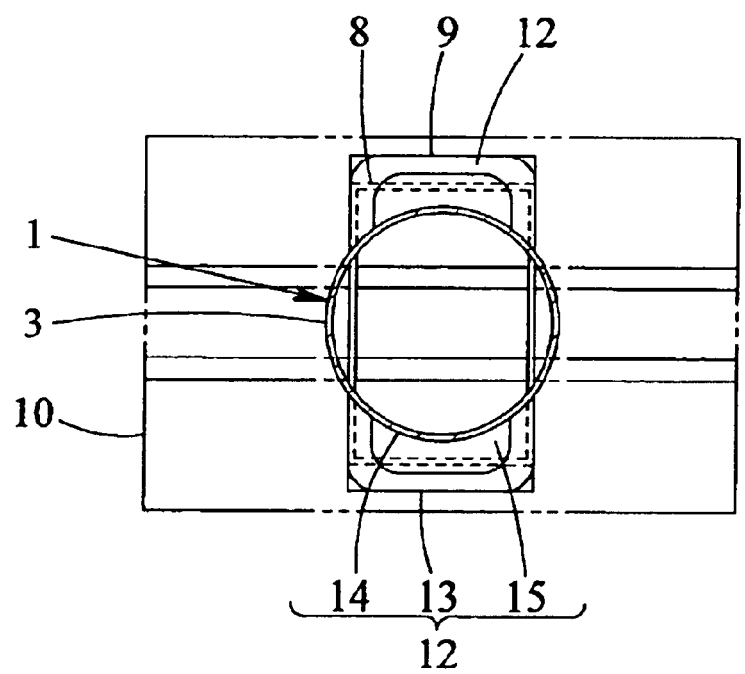
FIG. 6 is a sectional view taken along the line B—B in FIG. 4.
Figure 7:
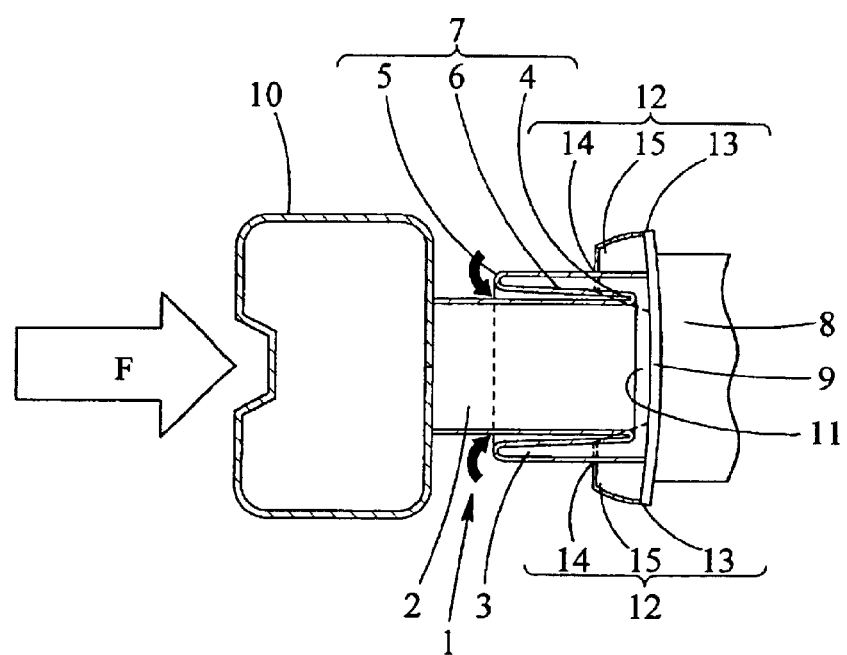
FIG. 7 is an axial sectional view corresponding to FIG. 4 and showing a shock absorber receiving a load and plastically deformed.

As seen in FIG. 7, the shock absorber according to the present invention is adapted to expand and disperse the impact energy of the load F, which is imparted from the bumper 10 to the smaller-diameter tube portion 2, in the range enclosed with the side member-side mounting edges 13 of the upper and lower load transmission members 12, 12 (refer to FIG. 6). As a result, when the load is imparted to the bumper, the mounting part 9 is only bent as a whole slowly, so that the collapse or deformation of the front end portion of the side member 8 do not occur.

In the shock absorber provided with the load transmission member 12, the range of application of the load F is expanded from the range of the rear end peripheral edge 11 of the larger-diameter tube portion 3 to that enclosed with the side member-side mounting edge 13 of the load transmission member 12, so that the collapse or deformation of the front end portion of the side member 8 is prevented. In other words, the load transmission members 12, 12 push back the mounting part 9 during load is applied, which is pressed by the rear end peripheral edge 11 of the larger-diameter tube portion 3 and about to be bent forward, and thereby prevent the bending of the mounting part 9 and in its turn the collapse or deformation of the front end portion of the side member 8.

Figure 4:
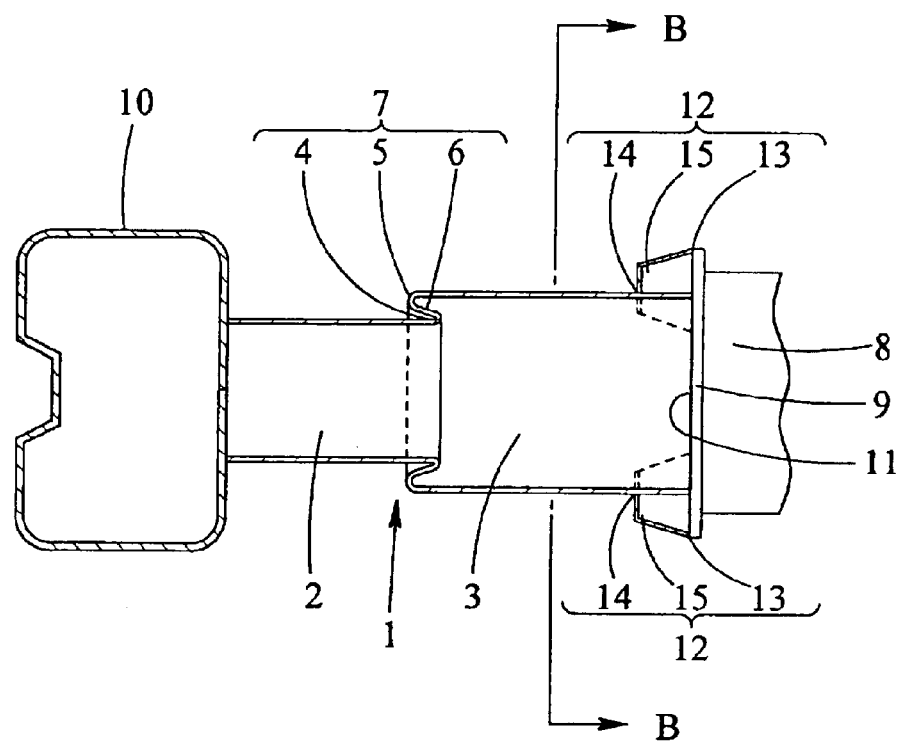
FIG. 4 is an axial sectional view of the shock absorber of FIG. 1.
Figure 5:
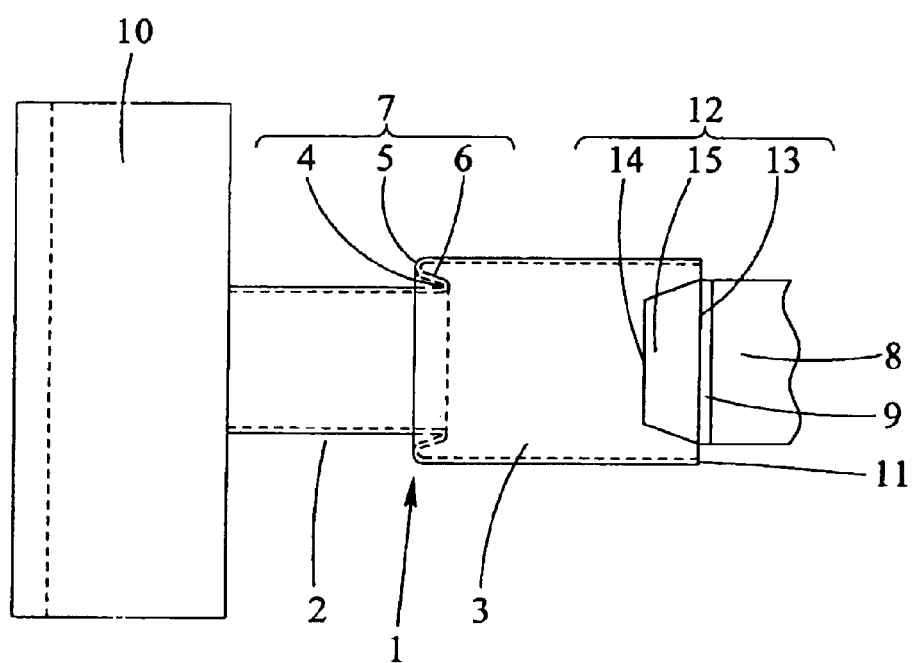
FIG. 5 is an axial plan view of the shock absorber of FIG. 1.
Figure 8:
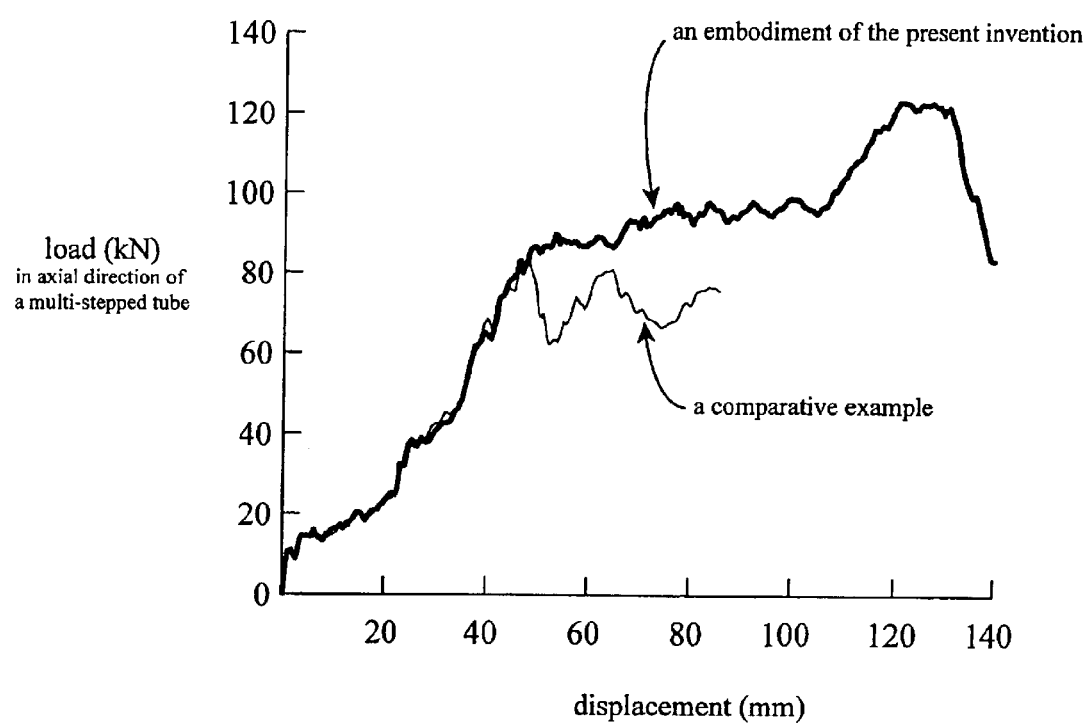
FIG. 8 is a graph showing the load-deformation characteristics of an embodiment and a comparative example.
Figure 9:
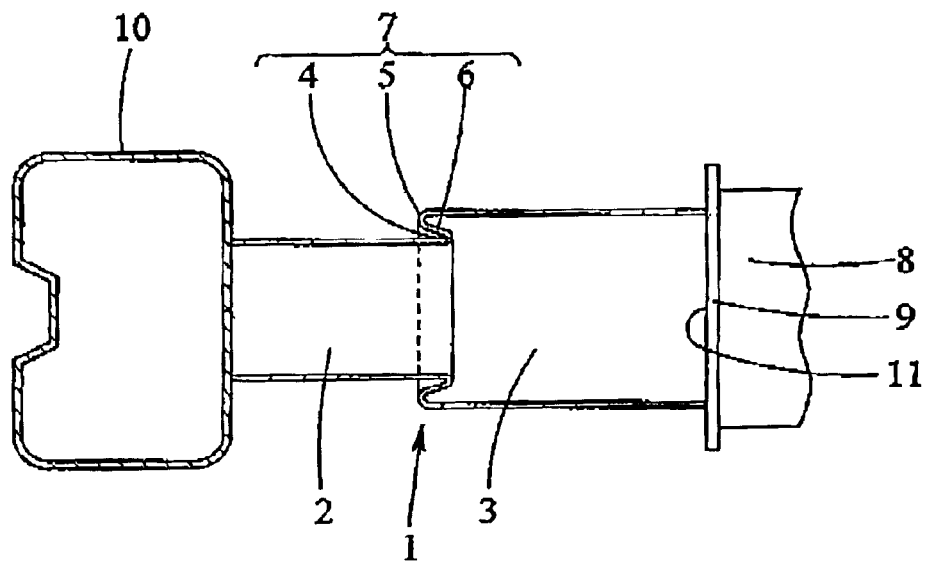
FIG. 9 is an axial sectional view of a shock absorber of the related art.
Figure 10:
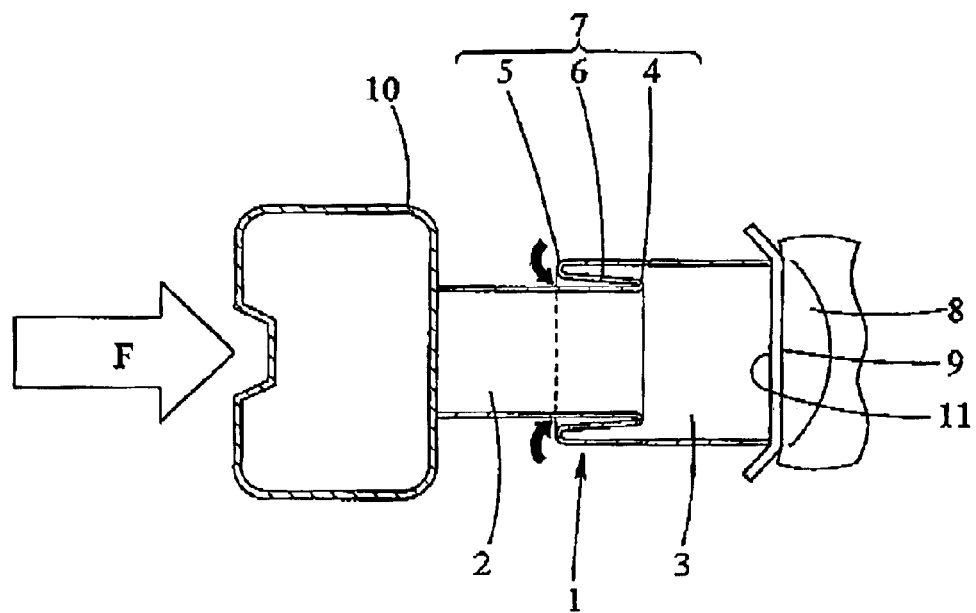
FIG. 10 is an axial sectional view corresponding to FIG. 9 and showing the shock absorber of the related art, receiving a load and plastically deformed.

In order to ascertain the effectiveness of the load transmission member in the shock absorber according to the present invention, a comparative experiment of the load-displacement characteristics (a quantity of the absorption of the smaller-diameter tube portion in the larger-diameter tube portion=variation of a load imparted to the smaller-diameter tube portion with respect to the displacement thereof, the impact energy to be absorbed corresponds to the area of the graph) was made in different cases where a load transmission member was provided or not. The embodiment (corresponding to what is shown in FIG. 4) and a comparative example (corresponding to what is shown in FIG. 9) were all shock absorbers both of which used a two-stage tube, and the embodiment is provided with such a substantially semi-frusto-conical load transmission member that was mentioned above. In the embodiment and comparative example, the shock absorber was fixed to a front end of an elasto-plastic side member of a vehicle of 1530 kg in weight via a mounting part, and the load-displacement characteristics were determined respectively by a computer analysis under the condition that the vehicle collided head-on against another at an initial speed of 15/km. The results of the experiments are shown in FIG. 8.

As is clear from the results of the experiments, the embodiment and comparative example show substantially equal load-replacement characteristics up to the level of displacement of the smaller-diameter tube portion of close to 60 mm.

However, in the comparative example, the curve of a load in the graph capable of being applied to the smaller-diameter tube portion waves from around a level of displacement of the smaller-diameter tube portion in excess of 60 mm, and discontinues at a level of displacement of 100 mm. This means that, at a point in time at which the displacement of the smaller-diameter tube exceeds 60 mm, the collapse or deformation of the front end portion of the side member occurs to finally cause it impossible to absorb the load any more due to the deformation of the side member as a whole.

On the other hand, in the embodiment based on the present invention, the load capable of being absorbed increases gently even after the displacement of the smaller-diameter tube portion exceed 60 mm. Such a load tends to decrease first when the displacement of the smaller-diameter tube portion reaches 130 mm but the load is still continuing to be absorbed. It has been ascertained in practice that the front end portion of the side member starts being deformed slightly in the vicinity of a level of displacement of the smaller-diameter tube portion of 125 mm. This means that the plastic deformation of the multi-diameter stepped tube serves to continue to absorb the impact energy as long as the collapse or deformation of the front end portion of the side member is prevented or suppressed to enable the larger-diameter tube portion to absorb the smaller-diameter tube portion therein.

In the shock absorber according to the present invention, since the impact energy is absorbed owing to the plastic deformation of the multi-diameter stepped tube, it is important that the plastic deformation mentioned above occurs as stably as possible. From the results of the experiments, it is noticed that the collapse or deformation of the front end portion of the side member is prevented or suppressed to cause the plastic deformation of the shock absorber to occur stably. Therefore, it can be said that the advantages of the present invention over the same kind of a related art shock absorber could be ascertained.

What is claimed is:

1. A shock absorber comprising
    a multi-diameter stepped tube having different diameter integral tube portions formed by partially reducing or partially enlarging a straight tube that can be plastically deformed, and at least one stepped portion formed between adjacent edges of each different diameter tube portions to join the tube portions integrally, in which a smaller-diameter tube portion as one end of the multi-diameter stepped tube is connected to a bumper, and in which a larger-diameter tube portion as other end of the multi-diameter stepped tube is connected to a side member,
    a mounting part, having a quadrilateral shape with a diagonal length of which is longer than a diameter of the larger-diameter tube portion, positioned at a front end of the side member,
    a load transmission member provided between an outer side surface of the larger-diameter tube portion and the mounting part, and
    wherein the load transmission member includes at least a pair of flat members each of which has a side member-side mounting edge extending along a shape of apart of an outer periphery of the mounting part, and a tube-side mounting edge extending along a shape of a part of an outer side surface of the larger-diameter tube portion.

2. A shock absorber according to claim 1, wherein the mounting part is a front end surface of the side member.

3. A shock absorber according to claim 1, wherein the mounting part is a plate member provided at the front end of the side member.

4. A shock absorber comprising
    a multi-diameter stepped tube having different diameter integral tube portions formed by partially reducing or partially enlarging a straight tube that can be plastically deformed, and at least one stepped portion formed between adjacent edges of each different diameter tube portions to join the tube portions integrally, in which a smaller-diameter tube portion as one end of the multi-diameter stepped tube is connected to a bumper, and in which a larger-diameter tube portion as other end of the multi-diameter stepped tube is connected to a side member,
    a mounting part, having a quadrilateral shape with a diagonal length of which is longer than a diameter of the larger-diameter tube portion, positioned at a front end of the side member,
    a load transmission member provided between an outer side surface of the larger-diameter tube portion and the mounting part, and
    wherein the load transmission member includes at least a pair of curved cover members each of which has a side member-side mounting edge extending along a shape of the outer periphery of the mounting part, and a tube-side mounting edge extending continuously along a shape of the outer side surface of the larger-diameter tube portion from an intersection of the mounting part and the larger-diameter tube portion to the side member-side mounting edge.

5. A shock absorber according to claim 4, wherein the mounting part is a front end surface of the side member.

6. A shock absorber according to claim 4, wherein the mounting part is a plate member provided at the front end of the side member.

* * * * *